Sept. 8, 1953  J. MORKOSKI  2,651,249
TRACTOR MOUNTED TREE EMBRACING ROTARY CULTIVATOR
Filed Sept. 29, 1950  3 Sheets-Sheet 1

Inventor,
James Morkoski
Paul O. Pippel
Atty.

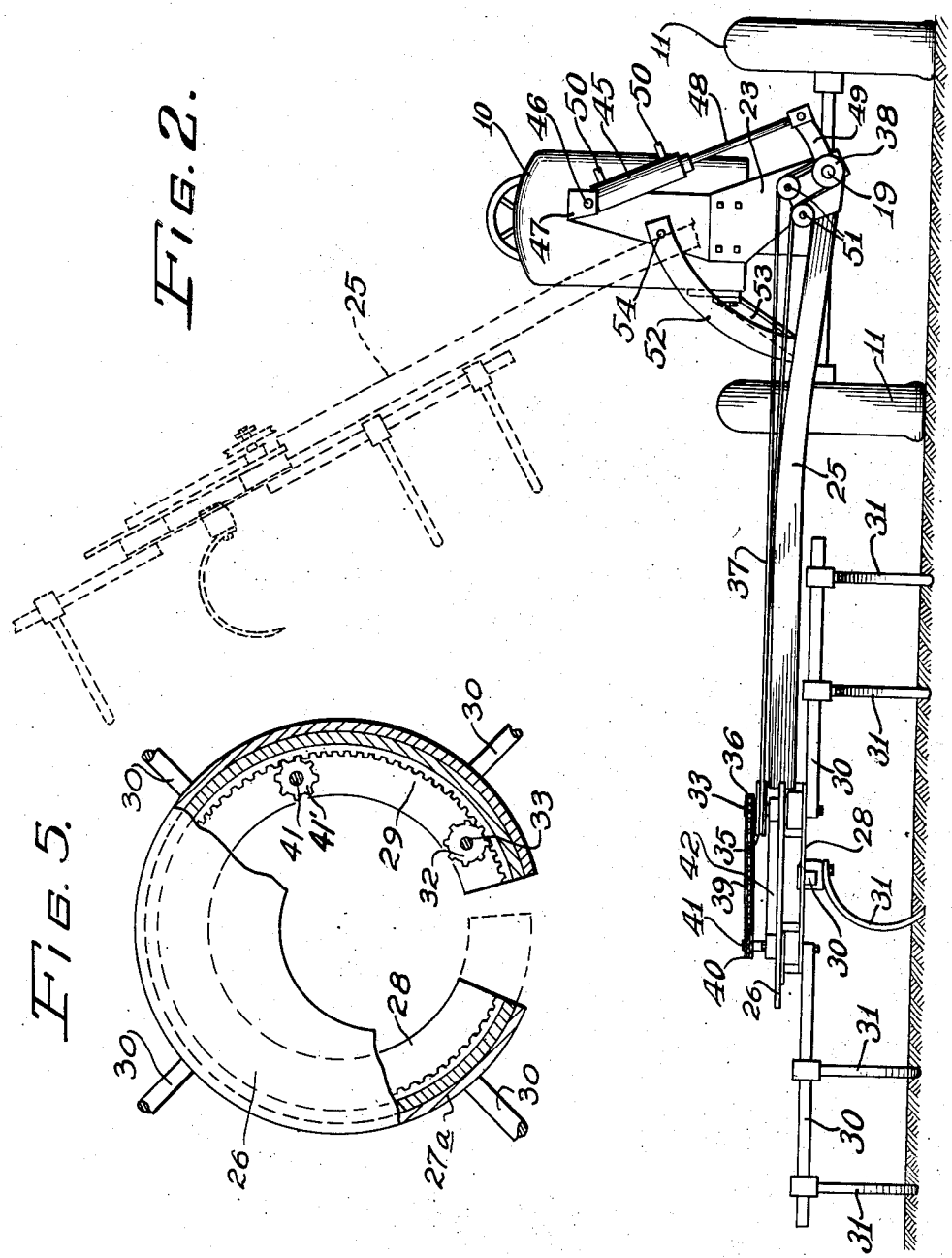

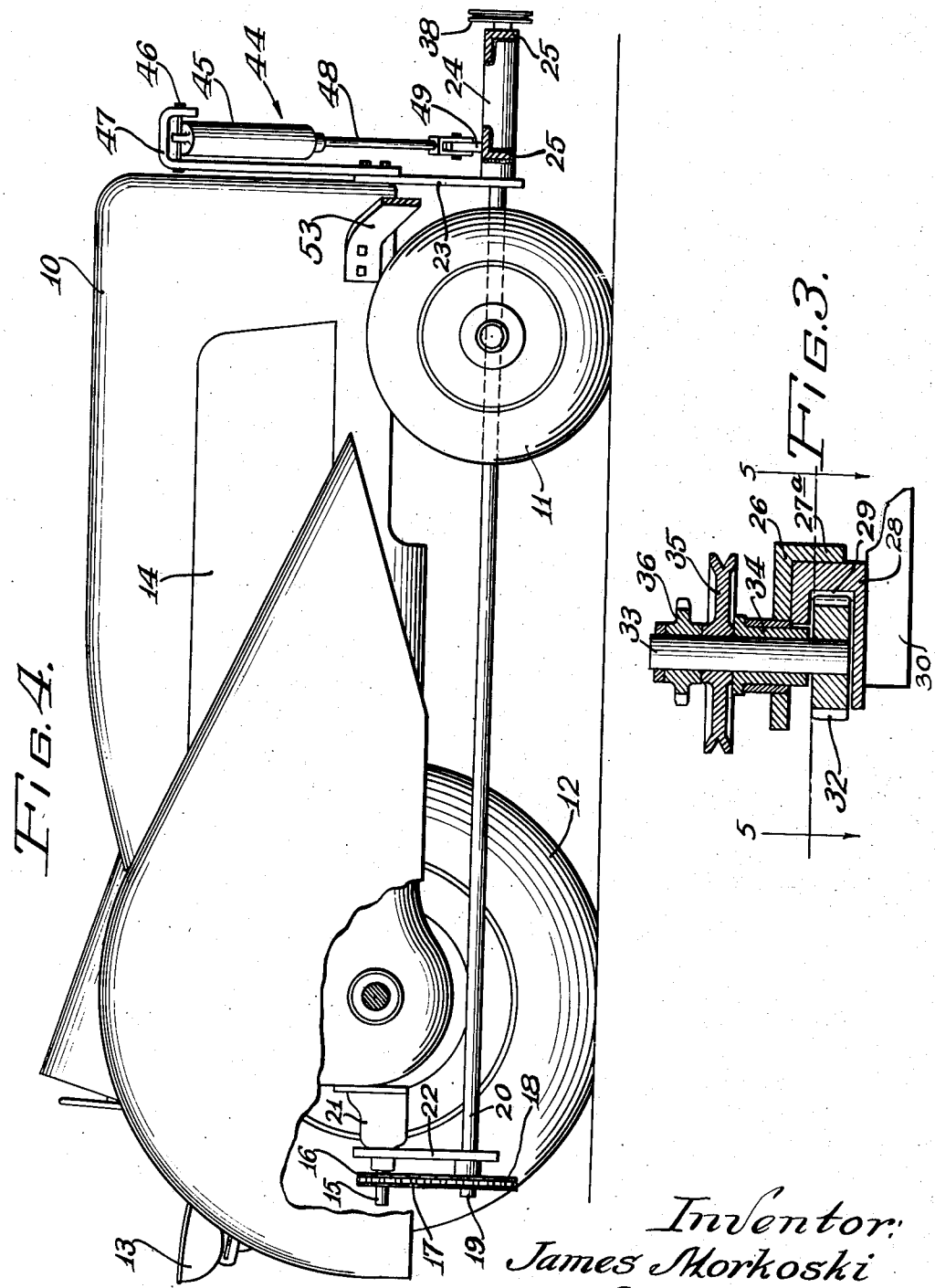

Patented Sept. 8, 1953

2,651,249

UNITED STATES PATENT OFFICE 2,651,249

TRACTOR MOUNTED TREE EMBRACING ROTARY CULTIVATOR

James Morkoski, Memphis, Tenn., assignor to International Harvester Company, a corporation of New Jersey Application September 29, 1950, Serial No. 187,514

8 Claims. (Cl. 97—136)

This invention relates to agricultural implements and particularly to an orchard cultivator. More specifically the invention concerns mobile machinery for cultivating the ground closely adjacent the trunks of trees.

In the past, machinery designed for the cultivation of trees, as in orchards and the like, has been in the nature of agricultural implements drawn by a tractor and attached thereto in such a way that the implement may extend laterally away from the tractor and in the vicinity of the trees to be cultivated. Up until the present time the problem has not been satisfactorily solved because foliage, roots and the like prevent a near approach of the tractor and the implement. Furthermore the danger of injury to the tree by the cultivating tools has made close approach to the tree trunk impractical. Satisfactory cultivation of orchards and the like has therefore in the past required manual cultivation after the orchard cultivator had done its work.

The present invention has for its object the provision of mobile machinery for cultivating closely adjacent trees without the necessity of a manual finishing operation.

Another object of the invention is the provision of an improved orchard cultivator which is capable of traversing a row of trees at one side thereof and moving successively from one tree to another to cultivate closely around the base of each tree.

Another object of the invention is to provide in an orchard cultivator mounted upon a tractive vehicle such as a tractor, a cultivating mechanism mounted upon the tractor and extending laterally therefrom for operating upon the ground adjacent the trees.

A further object of the invention is to provide an orchard cultivator comprising a plurality of cultivator tools mounted on a tractor and arranged to be driven from the tractor power plant to rotate in a circular path about a tree.

The invention contemplates the provision of an orchard cultivator including a tractive vehicle having a boom mounted thereon to extend laterally therefrom for swinging in a vertical plane, wherein the laterally projecting end of the boom is provided with a segmental member in the form of a broken annulus or ring having an opening in one side by which the machine may be advanced to a tree to permit the segmental member to partially surround the tree and wherein earth working tools driven from the tractor are arranged to move in a path about the member and the tree to cultivate the ground adjacent the tree trunk.

Other objects and advantages of the invention will become clear from the following detailed description when read in conjunction with the accompanying drawings wherein:

Fig. 2 is a front elevation of the structure shown in Fig. 1 and illustrating the manner in which the boom structure carrying the earth working tools is mounted upon the front end of the tractor for generally vertical swinging movement about a longitudinal axis.

Fig. 3 is an enlarged detail partly in section of a portion of the cultivating structure at the end of the boom support and illustrating particularly the manner in which the cultivating tools are mounted upon the support at the end of the boom for rotation in a circular path.

Fig. 4 is a view in side elevation partly in section of a portion of the structure shown in Figs. 1 and 2 and illustrating particularly the manner in which the drive for the cultivating tools is taken from the power take-off shaft of the tractor.

Fig. 5 is a plan view, partly in section, of the cultivator structure at the end of the supporting boom.

Figure 1:
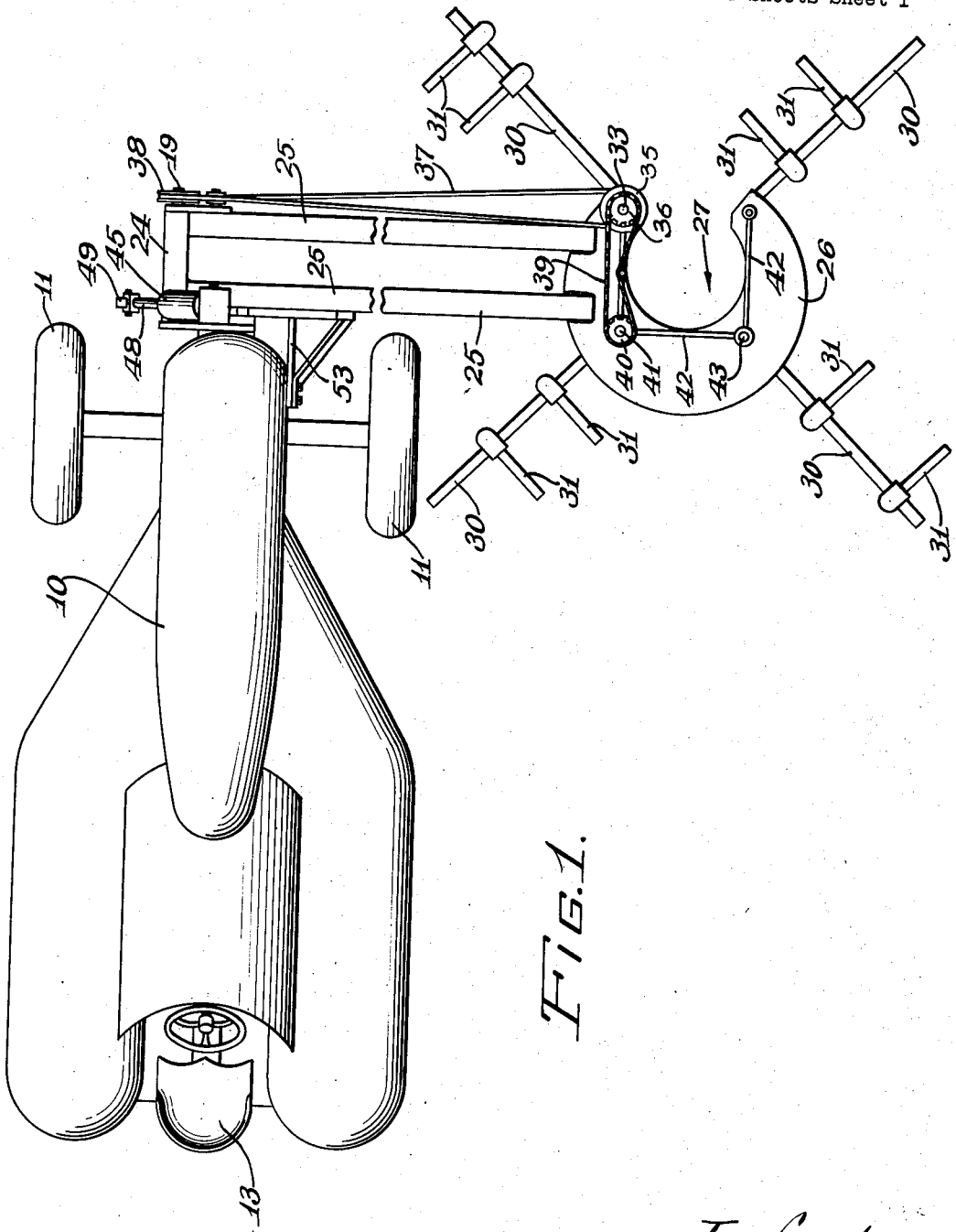
Fig. 1 is a plan view of an orchard tractor showing a tree cultivator embodying the features of the present invention mounted thereon.

Referring now to the drawings, it will be noted that the numeral 10 designates the longitudinally extending body of an orchard tractor having laterally spaced front wheels 11, rear drive wheels 12 and an operator's station 13.

The tractor is provided with a conventional power plant generally indicated at 14 which serves to operate the rearwardly projecting power take-off shaft 15 having mounted thereon a sprocket wheel 16 drivingly connected by a chain 17 with another sprocket wheel 18 on the rear end of a longitudinally extending shaft 19 carried in a sleeve 20 supported at its rear end from the power take-off shaft housing 21 by a strap 22. The forward end of the sleeve 20 supporting the shaft 19 is suspended by a plate 23 affixed to the forward end of the tractor and extending downwardly and somewhat laterally therefrom. The lower end of the plate 23 has secured to it and extending forwardly a sleeve member 24 which rotatably receives the shaft 19. A boom comprising a longitudinally spaced pair of supporting beams 25 is affixed to and extends laterally outwardly from the tractor. These beams 25 provide a support for the cultivating mechanism now to be described.

To the outwardly extending ends of the beams 25 is secured a segmental supporting member 26 generally in the form of a horseshoe extending horizontally parallel to the ground in the operating position of the tools and defining an opening 27. The opening 27 is of a size that will receive a tree to be cultivated. Communication is provided to the outside by a marginal recess which is also wide enough to straddle a tree when the machine is advanced down a row of trees and the supporting member 26 is presented toward the tree in a path perpendicular thereto. The supporting member 26, a portion of which is shown in section in Fig. 3, is provided with a downwardly extending flange 27ª. The upper portion of the support 26 and the flange 27ª serves to guide and confine another segmental member 28 conforming to the horseshoe shape of the supporting member 26 and having gear teeth 29 upon the inner periphery thereof. The member 28 serves as a carrier to support a plurality of tool bars 30 upon which are mounted curved cultivator teeth 31. These teeth are arranged upon the carrier 28 and the tool bars 30 in such a way as to follow a circular path when the carrier 28 is rotated about the member 26.

Rotation of the tool carrier 28 is effected by the provision of a toothed gear 32 arranged to mesh with the teeth 29 of the member 28 and affixed to the lower end of a vertically extending spindle 33. Spindle 33 is rotatably mounted in a bearing 34 carried in the upper portion of member 26. The upper end of the spindle has secured thereto a pulley 35 and a sprocket wheel 36. The spindle 33 to drive the carrier 28 is driven by an endless belt 37 trained around the pulley 35 and extending transversely toward the tractor to be trained at its other end around a pulley 38 mounted upon the forwardly projecting end of shaft 19.

Operation of the power take-off shaft 15 of the tractor therefore drives through the shaft 19 and the belt 37 to operate the pulley 35 and through toothed gear 32 to cause rotation of tool carrier 28 about the segmental supporting member 26 and about the tree to be cultivated. Additional driving stability is provided by an endless chain 39 connected to the sprocket wheel 36 and to another sprocket wheel 40 also mounted on the member 26 upon a spindle 41 carried by the member 26 in a manner similar to spindle 33 and having a toothed gear 41' also meshing with the teeth 29 of the carrier 28. Strengthening ribs 42 are provided on the support 26 extending between the spindles 33 and 41 and between bosses 43. While the supporting members 26 and the carrier 28 are arcuate with marginal openings or recesses in the manner of horseshoes for straddling a tree, the tool carrier 28 moves in a complete circle by bridging the gap formed by the marginal recess communicating with the opening 27.

The tractor 10 is, as pointed out before, an orchard type tractor and traverses a row of trees at the side thereof and at a sufficient distance therefrom to avoid as much as possible contact with the trunk as well as the shrubbery of the tree. The boom formed by the beams 25 which support the earth working tools at the outer end thereof is adapted to swing in a generally vertical plane about the pivot of the axle 19. Vertical movement of the boom and the earth working tools about this pivot is effected by a hydraulic ram unit 44 comprising a cylinder 45 anchored at one end to a pin 46 mounted in the bent upper end of a plate 47 secured to the front end of the tractor body and extending upwardly therefrom.

The piston rod 48 of the ram unit is pivotally connected to a lug or arm 49 affixed to and extending radially from the sleeve member 24. The ram unit 44 is provided with fluid under pressure through tubes 50 from a source on the tractor, not shown, and deriving power therefrom. Extension of the ram unit 44 rocks arm or lug 49 in a clockwise direction as viewed in Fig. 2 to raise the boom and cultivating unit to the transport position indicated in dotted lines. Retraction of the piston rod within the cylinder, of course, returns the unit to operating position.

The belt 37 for driving the cultivator unit from the tractor is tensioned by a pair of rollers 51 mounted upon the sleeve member 24. Stabilization and bracing of the boom and cultivator unit in its vertical movement between operating and transport positions is effected by a quadrant 52 mounted on straps 53 secured to the side of the tractor body at the front thereof. The cultivator boom bears against the quadrant 52 during its vertical movement and a stop 54 is preferably provided at its upper end to prevent overthrow of the boom.

From the foregoing it is believed that the operation of the orchard cultivator of the present invention will be clearly understood. With such a machine the cultivation of orchards is greatly facilitated. As the tractor moves down the orchard from tree to tree, the boom supporting the cultivator unit is lowered into position and advanced until the tree is received in the opening 27, whereupon the cultivator units are operated to work the ground around the tree and the machine is then backed away from the tree and the boom raised as the tractor advances to the next tree. It should also be understood, of course, that modifications may be made in the invention without departing from the spirit thereof or the scope of the appended claims.

What is claimed is:

1. A machine for cultivating trees comprising a tractive vehicle, a boom structure projecting from the vehicle and mounted thereon for generally vertical swinging movement about a longitudinal axis, a segmental supporting member at the laterally outer end of the boom having a central opening to receive therein a tree to be treated, cultivating tools carried at circumferentially spaced locations about said member and movable in a circular path about the center of said segmental member, and drive transmission means deriving power from the vehicle and operatively connected to said member for moving said tools in said circular path.

2. A machine for cultivating trees comprising a tractive vehicle, a boom structure projecting from the vehicle and mounted thereon for generally vertical swinging movement about a longitudinal axis, a segmental supporting member at the laterally outer end of the boom adapted to be arranged around the circumference of a tree to be treated, a guide track formed circumferentially about said segmental supporting member, a segmental carrier mounted on said supporting member in said guide track, tools mounted circumferentially about said carrier for engagement with the ground around the tree, and drive transmission means connecting the tractive vehicle to the carrier for driving said carrier around said track.

3. A machine for cultivating trees comprising a tractive vehicle, a boom structure projecting from the vehicle and mounted thereon for generally vertical swinging movement about a longitudinal axis, a segmental supporting member at the laterally outer end of the boom adapted to be arranged around the circumference of a tree to be treated, a guide track formed circumferentially about said supporting member, a segmental carrier mounted on said supporting member in said guide track, teeth formed on the periphery of said carrier, tools mounted circumferentially about said carrier for engagement with the ground around the tree, gearing engageable with the teeth of said carrier for moving the carrier around said guide track, and means deriving power from the vehicle for driving said gearing.

4. A machine for cultivating trees comprising a tractive vehicle, a boom structure projecting from the vehicle and mounted thereon for generally vertical swinging movement about a longitudinal axis, a segmental supporting member at the laterally outer end of the boom adapted to be arranged around the circumference of a tree to be treated, and having a marginal opening of a size greater than the diameter of the tree to be cultivated, whereby the trunk of the tree may be received in the interior of the supporting member upon presentation of the latter in a direction normal to the vertical plane of the tree, a segmental carrier mounted on said supporting member, cultivating tools carried at circumferentially spaced locations about said carrier, and drive transmission means deriving power from the vehicle and operatively connected to said carrier for moving the latter and said tools in a circular path about the tree.

5. An orchard cultivator comprising a tractor adapted to traverse the ground at one side of a row of trees, a power take-off shaft on the tractor, a boom pivoted on the tractor for swinging movement in a generally vertical plane and extending laterally therefrom across the row of trees, a horizontal supporting member mounted at the end of the boom in the path of the trees and having a central opening and a recess formed in the forward portion thereof to admit the trunk of a tree into said central opening upon advance of the tractor, whereby the supporting member partly encircles the tree, cultivating tools mounted at circumferentially spaced locations on the supporting member for movement thereon in a circular path about the tree, and transmission means deriving power from the power take-off shaft and operatively connected to said tools for moving said tools around the tree.

6. An orchard cultivator comprising a tractor adapted to traverse the ground at one side of a row of trees, a power take-off shaft on the tractor, a boom pivoted on the tractor for swinging movement in a generally vertical plane and extending laterally therefrom across the row of trees, a horizontal supporting member mounted at the end of the boom in the path of the trees and having a central opening and a recess formed in the forward portion thereof to admit the trunk of a tree into said central opening upon advance of the tractor, whereby the supporting member partly encircles the tree, a guide track on the supporting member defining a path about the central opening therein, a tool carrier mounted in said track and coextensive therewith, gear teeth formed on the periphery of said carrier, and a driving connection between said power take-off shaft and the teeth of said carrier for moving the latter in a circular path around the central opening.

7. An orchard cultivator comprising a tractor adapted to traverse the ground at one side of a row of trees, a power take-off shaft on the tractor, a boom pivoted on the tractor for swinging movement in a generally vertical plane and extending laterally therefrom across the row of trees, a horizontal supporting member mounted at the end of the boom in the path of the trees and having a central opening and a recess formed in the forward portion thereof to admit the trunk of a tree into said central opening upon advance of the tractor, whereby the supporting member partly encircles the tree, a guide track on the supporting member defining a path about the central opening therein, a tool carrier mounted in said track and coextensive therewith, gear teeth formed on the periphery of said carrier, and drive means for the carrier including a spindle mounted on the supporting member, a toothed gear mounted on said spindle and engageable with the teeth of said carrier, a pulley on the spindle, and a driving connection between said take-off and said pulley.

8. Tractor mounted orchard cultivating mechanism for working the ground around trees, comprising a movable support extending outwardly from the tractor in the path of the tree to be cultivated and pivotally mounted on the tractor for movement toward and away from the tree, a generally horseshoe-shaped member mounted at the end of the support adapted to partly surround the tree to be cultivated, said horseshoe-shaped member having a gap formed between its ends of sufficient diameter to admit the trunk of a tree upon advance of the tractor, an arcuately shaped tool carrier associated with said member for movement with respect thereto, guide means between said member and said carrier for directing the carrier in a path about the tree and a drive transmitting connection between the tractor and the carrier for rotating the latter in the guide means about the horseshoe-shaped member, the length of said carrier being sufficient to bridge the gap between the ends of said horseshoe-shaped member in its passage about the tree.

JAMES MORKOSKI.

References Cited in the file of this patent
UNITED STATES PATENTS

| Number | Name | Date |
|---|---|---|
| 509,544 | Moler | Nov. 28, 1893 |
| 720,113 | Collins | Feb. 10, 1903 |
| 779,870 | Robertson | Jan. 10, 1905 |
| 2,399,460 | Britton | Apr. 30, 1946 |
| 2,413,657 | Schenkelberg | Dec. 31, 1946 |
| 2,494,271 | Turner et al. | Jan. 10, 1950 |
| 2,514,766 | Judd | July 11, 1950 |